United States Patent [19]
Gaetani et al.

[11] 3,905,825
[45] Sept. 16, 1975

[54] AZO-ACETYL-ACETARYL PIGMENT COMPOSITIONS READILY DISPERSED IN ORGANIC MEDIA

[75] Inventors: Ermanno Gaetani, Milan; Vincenzo Massabo, Saronno, both of Italy

[73] Assignee: Aziende Colori Nazionali Affini ACNA S.p.A., Milan, Italy

[22] Filed: Jan. 31, 1974

[21] Appl. No.: 438,340

Related U.S. Application Data

[63] Continuation of Ser. No. 210,131, Dec. 20, 1971, abandoned.

Foreign Application Priority Data

[30] Dec. 19, 1970 Italy................................ 33266/70

[52] U.S. Cl.......... 106/308 N; 106/288 Q; 260/176; 260/193; 260/208; 260/309; 260/404.5
[51] Int. Cl............................................ C09b 67/00
[58] Field of Search......... 260/176, 208, 309, 404.5

[56] References Cited
UNITED STATES PATENTS

| | | | |
|---|---|---|---|
| 2,022,678 | 12/1935 | Kritchevsky et al. | 260/163 X |
| 2,315,870 | 4/1943 | Nadler et al. | 260/208 |
| 2,392,158 | 1/1946 | Lacey et al. | 260/169 |
| 2,442,972 | 6/1948 | Edelstein | 106/308 N X |
| 2,490,730 | 12/1949 | Paige | 260/187 |
| 2,555,603 | 6/1951 | Ogilvie | 260/208 X |
| 2,567,963 | 9/1951 | Petke | 260/163 X |
| 2,773,056 | 12/1956 | Helfaer | 260/208 |
| 3,049,533 | 8/1962 | Spitzer et al. | 260/197 |
| 3,244,734 | 4/1966 | Sonntag | 260/404 |
| 3,336,147 | 8/1967 | Mitchell et al. | 106/288 Q |
| 3,827,902 | 8/1974 | Schwerin et al. | 106/308 |

OTHER PUBLICATIONS

Kemisk, Chemical Abstracts, Vol. 63, 18473, (1965).
Farbenfabriuen, Chemical Abstracts, Vol. 71, 82785–82786 (1969).

*Primary Examiner*—Floyd D. Higel
*Attorney, Agent, or Firm*—Hubbell, Cohen, and Stiefel

[57] ABSTRACT

Organic pigment compositions that are easily dispersed in organic media are prepared by treating an azo - acetyl - acetaryl pigment or a reactant used in preparing such pigment at a temperature of about 70° to 200°C. for 3 to 24 hours with about 3% to 40% by weight of a heterocyclic amino compound having the formula

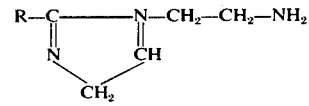

or the precursor thereof having the formula

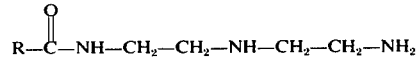

where R is a saturated or unsaturated aliphatic group having 7 to 23 carbon atoms.

7 Claims, No Drawings

AZO-ACETYL-ACETARYL PIGMENT COMPOSITIONS READILY DISPERSED IN ORGANIC MEDIA

This is a continuation of application Ser. No. 210,131, filed Dec. 20, 1971, and now abandoned.

BACKGROUND OF THE INVENTION

The present invention relates to new organic pigment compositions that are resistant to flocculation and which are easily dispersed in organic media. These compositions are obtained by using a particular group of amine compounds having a long aliphatic or cycloaliphatic chain.

SUMMARY OF THE INVENTION

The organic pigments that are suitable for use in this invention are azo-acyl-acetaryl pigments.

Amino compounds particularly suitable for use with the organic pigment compositions so as to render them readily dispersable, include long aliphatic chain heterocyclic amines of the formula:

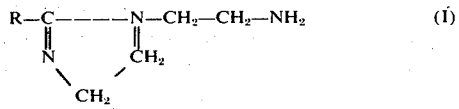

(I)

as well as aliphatic diamines which are precursors of the heterocyclic compounds of formula (I), said precursors being of the formula (II):

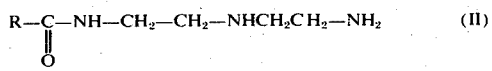

(II)

wherein R in each of formula (I) and formula (II) is either a saturated or unsaturated aliphatic chain containing from 7 to 23 carbon atoms, or a radical of a natural or modified resin acid.

DETAILED DESCRIPTION OF THE PREFERRED EMBODIMENTS

Examples of organic radicals represented by R include alkyl radicals such as octadecyl, hexadecyl, tetradecyl, decyl, etc.; substituted alkyl radicals such as, e.g., hydroxyoctadecyl; alkenyl radicals such as the radical derived from unsaturated acids such as octadecylenic acid and dodecylenic acid, i.e., $\Delta 9,10$-octadecylene and $\Delta 9,10$-dodecylene, etc.; or radicals of resin acids such as, e.g., radicals derived from abietic acid, dehydroabietic acid, tetrahydroabietic acid, etc.

The amine compounds of the formulas (I) and (II) may be incorporated into pigment compounds in an amount of from about 3 to 40% by weight with respect to the weight of the pigment, and preferably in an amount of from about 4 to 20% by weight.

Various methods of incorporation may be employed. For instance, the amine compounds of the formulas (I) and (II) may be added to the coupling mass by heating the latter to a temperature of from about 70° and 200°C., and preferably from 80° to 170°C., for a period of about 3 to 24 hours.

The preparation of the pigment compositions of this invention may be carried out at temperatures of from about 70°C. to 200°C., by contacting the azo-acyl-acetaryl pigment with one or more amine compounds of the formulas (I) and (II), or by simply mixing the products as they are, or by mixing them in an anhydrous medium, e.g., an anhydrous organic solvent such as, toluene, xylene, naphtha-solvent, or by mixing them in an aqueous suspension.

A second method for the preparation of the easily dispersed organic pigments of this invention comprises heating, to the boiling point, in a water-miscible organic solvent, such as ethanol, the acyl-acetaryl coupling agent with one or more amine compounds of the general formulas (I) and (II), followed by coupling the resulting product with the desired diazonium salt.

In British Pat. No. 1,080,115 there is described a process for the preparation of organic pigments of easy dispersability by heating the untreated pigment in an aqueous medium with a quantity by weight of from 8 to 25% of an N-alkyl-alkylene-diamine, wherein the alkyl is a hydrocarbon radical having from 7 to 23 carbon atoms, such as, for instance, the Duomeen T (which basically is an octadecyl-amino-propyl-amine).

In French Pat. No. 1,538,270 there is described a way to prepare easily dispersed organic pigment compositions by treating azo-acyl-acetaryl pigments in the dry state or alkaline aqueous dispersions thereof, with cycloaliphatic diamines having nuclei formed of 5 or 6 atoms, such as, N-cyclohexyl-propylene-diamine (1,3).

By contrast, with the easily dispersible organic pigments prepared using the two above mentioned processes of the prior art, the organic pigments dispersed according to this invention, and particularly those obtained by treatment with a heterocyclic amine of the formula (I), offer the following advantages:

They retain their original color shade almost unaltered, thus allowing one to obtain purer and brighter pigment compositions.

They display a superior dispersion rate in organic media (toluene, xylene, heptane, etc.), thus permitting a more rapid and homogeneous preparation of the pigment compositions.

The pigment compositions, and more particularly, rotogravure printing inks prepared with the easily dispersible pigments of this invention, show an improved transparency. This is of considerable importance in rotogravure printing, especially in three-color and four-color printing.

The rotogravure printing inks that are prepared with the pigment compositions of the invention, at equal pigment concentration, are more fluid and thus enable one to obtain a much sharper and faster printing.

The present invention will be further illustrated by the following examples, wherein all parts and percentages are expressed by weight, unless otherwise indicated.

EXAMPLE 1

To an aqueous Yellow Pigment No. 12 slurry, obtained by tetrazotization of 25.3 parts by weight of 3,3'-dichlorobenzidine and subsequent coupling with 35.4 parts by weight of acetoacetanilide, was added a solution of 16 parts by weight of Imidrol SC in 6 parts by weight of acetic acid and 200 parts by weight in water. (Imidrol SC is a registered trademark for a cyclic diamine of the formula (I) wherein the aliphatic side chain, i.e., R is saturated $C_{17}$).

The suspension was then adjusted to a pH of 12 by adding NaOH of 1:1; heated to 90°C. for 5 hours and then filtered, washed and the pasty mass dried at 60°C.

The dry product thus obtained, reduced to a powder, dispersed quite easily without any grinding in a medium for rotogravure printing inks. It showed dispersability, transparency, fluidity and brightness characteristics considerably superior to those of the same pigment that hand not been so treated.

EXAMPLE 2

The procedure followed in Example 1 was repeated using a Yellow Pigment No. 13 slurry, obtained from the tetrazotization of 25.3 parts by weight of 3,3'-dichlorobenzidine coupled with 41.0 parts by weight of aceto-acet-meta-xylidine.

There was thus obtained a pigment of a particularly pure hue, which, also had excellent dispersability, transparency and fluidity characteristics not found when using the untreated pigment.

EXAMPLE 3

To the Yellow Pigment No. 12 slurry of Example 1 was added a solution of 16 parts by weight of stearoyl-diethylene-triamide, $CH_3(CH_2)_{16}CONH-CH_2-CH_2-NH-CH_2-CH_2-NH_2$, in 6 parts of acetic acid and 400 parts by weight of water. [The stearoyl-diethylene-triamide, $CH_3(CH_2)_{16}CONH-CH_2-CH_2-NH-CH_2-CH_2-NH_2$, was obtained by condensation, at 150° to 160°C., of 142 parts by weight of stearic acid with 60 parts by weight of diethylene-triamine $(H_2N-CH_2CH_2NHCH_2CH_2NH_2)$.] After alkalinization to a pH of 12, the procedure was carried out as described in Example 1.

The pigment thus obtained displayed applicative characteristics similar to those of the pigment treated according to Example 1.

EXAMPLE 4

The aqueous Pigment Yellow 12 slurry of Example 1 was treated following the same procedure described therein, using, in one case 16 parts by weight of Imidrol OC, and in a second case 16 parts by weight of Imidrol LC, thereby obtaining pigments with applicative characteristics corresponding substantially to those of the pigment treated according to Example 1. (Imidrol OC and Imidrol LC are registered trademarks for cyclic diamines of formula (I); in the former R is unsaturated aliphatic chain of 17 carbon atoms, while in the latter R is a saturated aliphatic chain of 11 carbon atoms.)

EXAMPLE 5

To aqueous Yellow Pigment No. 12 slurry of Example 1 was added an aqueous solution made up of 35 parts by weight of Imidrol OC acetate. Thereafter the procedure was as described in Example 1. The pigment that was obtained showed transparency and fluidity characteristics superior to those of the pigment prepared according to the procedures described in Example 1.

EXAMPLE 6

A solution containing, in 30 parts by weight of ethanol, 17.7 parts by weight of acetoacetanilide and 20.5 parts by weight of Imidrol LC, was heated at reflux for 30 minutes and then diluted with 20 parts by weight of ethyl alcohol. The working mixture thus obtained was poured onto the aqueous tetrazo solution of 12.7 parts by weight of 3.3'-dichlorobenzidine and buffered with sodium acetate until complete disappearance of the acidity using Congo Red as an indicator.

The thus obtained dye was alkalinized with NaOH to a pH of 12, and then maintained at 90°C. for 5 hours, thereafter filtered, washed and dried at a temperature of 60°C. There was thus obtained a pigment that was easily dispersible in organic media and endowed with good fluidity and transparency.

To the pigment thus obtained at the end of the above described coupling there were added 230 parts by weight of Cellosolve, followed by stirring for 30 minutes with the addition of $NH_4OH$ until an alkaline reaction was obtained at the Bright Yellow. To the suspension there were added 380 parts by weight of chloroform.

The pigment thus obtained passed into the organic phase which, after separation of the aqueous phase, was then diluted with 500 parts by weight of methanol.

The suspension was then filtered, and washed with methanol and then with water. After drying there was obtained a product that was readily soluble in aromatic hydrocarbons. 5 parts by weight of this product, admixed with 95 parts by weight of untreated Yellow Pigment No. 12, were dispersed in a medium for rotogravure based on esterified colophony (rosin) and toluene.

The resulting printing ink showed considerably better transparency and fluidity characteristics than those of a similar ink prepared only with Yellow Pigment No. 12.

EXAMPLE 7

13 parts by weight of Yellow Pigment No. 12 in a powdery state, were dispersed in 40 parts by weight of Imidrol OC. This mixture was maintained at 90° to 100°C. for 16 hours and was then heated to 150°C. for 30 minutes. After cooling to 80°C., the doughy mass, deep yellow-orange in color, was diluted with 100 parts by volume of toluene, and was then further diluted with 300 parts by volume of methanol.

The slightly orange-yellow suspension was refluxed for 15 minutes and was then filtered, washed with 300 parts by weight of warm methanol and then with water, and finally was dried at 60°C.

The product thus obtained was readily soluble in aromatic hydrocarbons. This product, added in quantities ranging from 2.5 to 10% to Yellow Pigment No. 12 in rotogravure inks, considerably improved their transparency and fluidity.

EXAMPLE 8

25 parts by weight of Imidrol LC were melted at 60°C. in a mixer and were then added to 75 parts by weight of Yellow Pigment No. 12. The mass was then brought to 140°C. for 2 hours and then was permitted to cool under agitation. The plastic red-brown mass gradually was transformed into a coarse powder which was then ground into a pigment having characteristics corresponding to those of the pigment of Example 1.

Variations can, of course, be made without departing from the spirit and scope of this invention.

What we desire to secure by Letters Patent and hereby claim is:

1. An organic pigment composition that is obtained by treating an azo-acetyl-acetaryl pigment at a temperature of from about 70° to 200°C., for a period of from about 3 to 24 hours, with from about 3 to 40% by weight, based on the weight of the pigment, of an amine compound selected from the group consisting of (A) a heterocyclic amino compound of the formula:

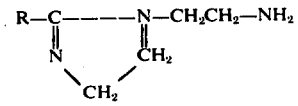 (I)

and (B) an aliphatic diamine that is a precursor of the amino compound of formula (I), said diamine being of the formula:

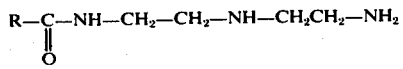 (II)

wherein R represents, in each of formulas (I) and (II), an aliphatic chain selected from the group consisting of octadecyl, hexadecyl, tetradecyl, hydroxyoctadecyl, Δ9,10-octadecylene and Δ9,10-dodecylene; or a radical from a natural or modified resin acid selected from the group consisting of abietic acid, dehydroabietic acid and tetrahydroabietic acid.

2. The composition of claim 1 wherein said treatment is effected in the dry state.

3. The composition of claim 1 wherein said treatment is effected in an aqueous alkaline dispersion.

4. The composition of claim 1 wherein said treatment is effected in an anhydrous organic solvent.

5. The composition of claim 1 wherein after said treatment the resulting pigment composition is dried and formed into a powdery material.

6. The composition of claim 1 wherein the amino compound is used in an amount of from about 4 to 20% by weight with respect to the weight of the pigment.

7. The composition of claim 1 wherein said treatment with the amino compound is effected prior to a coupling reaction to form said azo-acetyl-acetaryl pigment, said treatment being effected by contacting said amino compound, in a water-miscible organic solvent at its reflux temperature, with an acetyl-acetaryl azo-compound, and then effecting coupling with a diazo compound.

* * * * *

PO-1050
(5/69)

UNITED STATES PATENT OFFICE
CERTIFICATE OF CORRECTION

Patent No. 3,905,825     Dated September 16, 1975

Inventor(s) Ermanno GAETANI and Vincenzo MASSABO

It is certified that error appears in the above-identified patent and that said Letters Patent are hereby corrected as shown below:

Title page, left side, under "Foreign Application Priority Data": "33266/70" should read -- 33266-A/70 --.

Column 1, lines 24-28: "R-C-----N-" should read -- R-C―――N- --.

Column 3, line 6: "hand" should read -- had --.

Column 5, lines 4-8: "R-C-----N-" should read -- R-C―――N- --; line 19: "tetradecyl, hydroxyoctadecyl" should read -- tetradecyl, decyl, hydroxyoctadecyl --.

Signed and Sealed this sixth Day of January 1976

[SEAL]

Attest:

RUTH C. MASON
Attesting Officer

C. MARSHALL DANN
Commissioner of Patents and Trademarks